Patented Dec. 21, 1948

2,456,750

UNITED STATES PATENT OFFICE 2,456,750

REACTION PRODUCTS OF PYRIDINE AND ALLERGENIC EXTRACTS OF PLANTS OF THE GENUS RHUS

Margaret B. Strauss, New York, N. Y.

No Drawing. Application March 31, 1945, Serial No. 586,026

13 Claims. (Cl. 260—236.5)

1

This invention relates generally to processes for treating plant parts to derive new physiologically active compounds therefrom of a nature wholly different from naturally-occurring substances; in a more particular sense, the invention is concerned with novel antigenic compositions and with processes whereby such compositions can be obtained.

It has long been known that certain plants can provide sources of principles, the exact nature and chemical composition of which are not now fully understood, that are characterized by high degrees of physiological activity and that are capable of producing certain forms of allergy syndrome, for example asthma, hay fever and dermatitis. These principles which are commonly known as allergens can be classified in two groups based upon a syndrome manifested by persons affected by the allergen; a first group composed of proteinaceous allergens that produce hay fever or asthma upon inhalation; and a second group of nonproteinaceous allergens that produce a dermatitis upon contact with a hypersensitive individual. The fundamental chemical differences between these two classes of allergens is reflected not only in the differences of syndrome produced but also is manifested in the wholly different methods by which the allergens are obtained from the plants.

It has also been known for a considerable period that various methods of processing plants can yield materials more or less useful in the preparation of medicaments which can be employed in diagnosis, mitigation and treatment of such allergy syndromes.

The present invention relates to improvements in methods in obtaining the second class above mentioned, namely, the non-proteinaceous allergens which produce the characteristic dermatitis upon contact with hypersensitive persons.

In the past various methods of processing these plants to obtain the principles therefrom have been utilized but the so-called extracts thus obtained have possessed characteristics that materially and disadvantageously limited their field of utility, particularly in instances where it was necessary or desirable to treat the affected person by injections. These disadvantages have in at least a large measure been due to the vehicle (alcohol and/or oil solution) used to maintain

2 the principle in condition for injection, i. e., the liquid component of the extract was irritant or toxic when administered by injection.

Alcohol extracts, which usually are prepared by extracting the selected plant parts with alcohol (95% or higher), in addition to possessing the disadvantages above mentioned, are further undesirable because of the tendency of the principle when in this solution to loose its biological activity, especially following dilution with water as is necessary before injection, with the result that administration of an accurately controlled dosage is made very difficult.

No attempt heretofore to provide an aqueous extract has succeeded because the presence of moisture in the extract caused rapid deterioration of the physiologically active component.

Oil extracts are usually prepared by extracting the selected plant parts with ether, toluene, or the like to obtain a solution of the active resinous material, filtering, evaporating the solvent and dissolving the residue in an oil, for instance corn oil, olive oil, sesame oil or peanut oil. Such oil extracts are not favorably regarded by clinicians or patients because of the difficulty of cleaning the equipment used when administering same and also because it is necessary to administer oil extracts intramuscularly instead of permitting more subcutaneous administration. Moreover instance are known in which further problems have arisen due to the treated person's sensitivity to protein components of the oil vehicle, particularly when peanut oil is used.

In accordance with the present invention, there is now provided a non-proteinaceous allergenic substance having full physiological potency which requires no special care in handling or administration, which can be administered subcutaneously as desired without the painful effects produced by alcohol or oil extracts, and which maintains its full physiological activity even after storage for substantial periods of time. One of the more important characteristics of the novel products obtained according to this invention is that they can be diluted with water or saline solution (for preparation of isotonic solutions) and when thus diluted full physiological activity is maintained without perceptible deterioration when stored under usual conditions for reasonable periods of time.

The process of the present invention, viewed in general terms, includes direct extraction of the selected plant parts with an organic base such as a heterocyclic tertiary amine, preferably pyridine, quinoline or the like, whereby the physiologically active principles in the plant parts chemically combine with a part of the organic base to form a soluble physiologically active compound, and separating such extract from the extracted plant parts. Further contemplated within this invention is the preparation of a physiologically active allergenic substance by treatment of said extract with alum or the like.

To illustrate the application of the principles of this invention, the process will be described in general terms as applied to treatment of plants such as poison ivy, poison oak, and poison sumac. Parts of the selected plants are treated with pyridine or quinoline at room temperature or at elevated temperatures and with suitable agitation. The period of treatment is dependent upon the temperature used and the degree of concentration of allergen desired in the product; in general, longer periods of treatment and higher temperatures yield higher concentrations of the allergenic substances. The plant parts used can be in fresh or desiccated condition. This treatment yields a solution containing the reaction product of the pyridine or quinoline with the physiologically active allergenic principle of the plant. This solution is usually of a dark green color and is autosterilizing.

The novel antigenic substances according to this invention are obtained from the pyridine or quinoline solution so prepared by treating said solution with alum or the like. In accordance with practice of the process of this invention, the product is a flocculent precipitate composed of minute particles that readily settles from the supernatant liquor. This product is removed by filtration and can be purified by washing with water. If preferred, the product can be separated by centrifuging the mixture and decanting the supernatant liquor. This product is substantially insoluble in water, exhibits high antigenic activity and can be easily suspended in isotonic saline solution for administration by injection. Its allergenic activity does not materially diminish upon storage at room temperature.

This novel allergenic product is non-toxic and non-irritating as is shown by a series of tests conducted as follows. Thirty-two individuals (randomly selected), having no previous history of hypersensitivity of the type manifested by contact dermatitis, were administered subcutaneous injections of this product in various dilutions without any detectable reactions, local or systemic.

This novel allergenic product is not an irritant, per se, as is shown by the consistently negative patch tests, performed in the usual manner, on thirty-seven individuals (randomly selected) having no previous history of hypersensitivity of the type manifested by contact dermatitis.

The product contains the specific active allergenic fraction from the plant parts as is shown by consistently positive patch tests, performed in the usual manner, on sixty-five individuals with previous histories of contact dermatitis of the poison ivy type.

This novel antigenic product contains the specific active allergenic fraction from the plant parts as is shown by the ability of said product to sensitize (for the first time) guinea pigs by a single intraperitoneal injection. Their sensitization was shown by the presence of a positive patch test consisting of erythema and vesicles, when the patch test with this antigenic product was placed three to four weeks after the sensitizing dose.

The stability of the novel antigenic product according to this invention was established by comparative tests upon (1) a freshly prepared product from a pyridine solution that had been stored at room temperature for one year; (2) a final allergenic product that had been stored in aqueous saline solution for a period of one year; and (3) as a control, a freshly prepared final allergenic product. Patch testing of these three products showed no detectable difference in allergenic activity when applied to a substantial number of hypersensitive individuals.

The immunological importance of this product is shown by the relief obtained from phylactic treatment. Forty-seven sensitive individuals from a group of fifty, exhibiting characteristic dermatitis obtained relief after the first to sixth subcutaneous injection of the product according to this invention.

The immunological importance of this novel product in prophylactic treatment is shown by the results obtained when thirty-seven individuals with previous histories of contact dermatitis due to poison ivy or the like, treated with gradually increased concentrations of this novel antigenic product, were freed of symptoms during the following season with the exception of a few individuals who experienced only a mild attack of dermatitis.

The following examples illustrate methods of carrying out the present invention, but it is to be understood that these examples are given by way of illustration and not by way of limitation.

*Example I*

About 10 grams of dried poison ivy leaves are ground and extracted with approximately 100 ml. of pyridine for 24 hours at room temperature. When the pyridine is initially added to the ground leaves minute bubbles of gas are formed on the surface of the solid material, apparently due to a reaction between the pyridine and the leaves, and subsequently escape from the liquid to the atmosphere. The extracted leaf meal is then removed and the liquid thus obtained is a solution of the reaction product of pyridine with the allergenic component present in the leaves. It is sterile, deep green in color and is used as a stock solution from which the final product is made. Although the exact nature of this product is not known it is believed to be a quaternary pyridinium salt. About 40 ml. of the stock solution and about 100 ml. of water are mixed and about 36 ml. of a 0.25 N sulphuric acid solution containing about 2 per cent by weight of potassium alum is slowly added and with continuous agitation. The reaction product is obtained as a voluminous, finely divided, deep green precipitate, which after standing at about 5° C. is removed from the supernatant liquid and washed with isotonic saline solution containing a small amount of phenol. This product is then suspended in isotonic saline solution for use in administration by injection.

*Example II*

About 10 grams of freshly harvested poison ivy leaves are ground and are extracted with approximately 100 ml. of pyridine at room temperature for 24 hours. The mixture is filtered. The filtrate is mixed with an equal volume of water and the mixture is treated with about 36 ml. of 0.25 N sulfuric acid solution containing about 2 per cent by weight of potassium alum, as in Example I. This mixture is further processed as in Example I and yields a product identical as that there described, and when suspended in isotonic saline solution is useful for administration by injection.

*Example III*

About 10 grams of freshly harvested poison ivy leaves are ground and are extracted with approximately 50 ml. of pyridine at room temperature for 24 hours. The mixture is filtered. About 50 ml. of this filtrate is mixed with 100 ml. of water and the mixture is treated with about 36 ml. of 0.25 N sulfuric acid containing about 2 per cent by weight potassium alum, as in Example II. This mixture is further processed as in Example II and yields a product identical as that there described, and when suspended in isotonic saline solution is useful for administration by injection.

*Example IV*

The procedure described in Example I is repeated with the exception that dried poison oak leaves are substituted for the dried poison ivy leaves that are employed. The final product obtained is similar in appearance to that described in Example I, and when suspended in isotonic saline solution is useful for administration by injection.

*Example V*

The procedure described in Example II is repeated with the exception that freshly harvested poison oak leaves are substituted for the freshly harvested poison ivy leaves that are employed. The final product obtained is similar in appearance to that described in Example II, and when suspended in isotonic saline solution is useful for administration by injection.

*Example VI*

The procedure described in Example III is repeated with the exception that freshly harvested poison oak leaves are substituted for the freshly harvested poison ivy leaves that are employed. The final product obtained is similar in appearance to that described in Example III, and when suspended in isotonic saline solution is useful for administration by injection.

*Example VII*

The procedure described in Example I is repeated with the exception that dried poison sumac leaves are substituted for the dried poison ivy leaves that are employed. The final product obtained is similar in appearance to that described in Example I, and when suspended in isotonic saline solution is useful for administration by injection.

*Example VIII*

The procedure described in Example II is repeated with the exception that freshly harvested poison sumac leaves are substituted for the freshly harvested poison ivy leaves that are employed. The final product obtained is similar in appearance to that described in Example II, and when suspended in isotonic solution is useful for administration by injection.

*Example IX*

The procedure described in Example III is repeated with the exception that freshly harvested poison sumac leaves are substituted for the freshly harvested poison ivy leaves that are employed. The final product obtained is similar in appearance to that described in Example III, and when suspended in isotonic saline solution is useful for administration by injection.

*Example X*

About 5 grams of dried or freshly harvested poison ivy leaves are ground and extracted with about 100 ml. of pyridine in a Soxhlet extractor for about 1½ hours. By this time the washings with pyridine are colorless. The extract so obtained is further treated as described in Example I and the product obtained is similar to that therein described, and when suspended in isotonic saline solution is useful for administration by injection. This procedure is also satisfactory for preparing allergenic substances from poison oak, poison sumac and primrose.

*Example XI*

The procedure described in Example I is repeated with the exception that 48 ml. of a solution containing about 2 per cent by weight of potassium alum is substituted for 36 ml. of a 0.25 N sulfuric acid solution containing about 2 per cent by weight of potassium alum. The final product obtained is similar in appearance to that described in Example I, and when suspended in isotonic saline solution is useful for administration by injection.

*Example XII*

The procedure described in Example V is repeated with the exception that 48 ml. of a solution containing about 2 per cent by weight of potassium alum is substituted for 36 ml. of 0.25 N sulfuric acid solution containing about 2 per cent by weight of potassium alum. The final product obtained is similar in appearance to that described in Example V, and when suspended in isotonic saline solution is useful for administration by injection.

*Example XIII*

The procedure described in Example IX is repeated with the exception that 48 ml. of a solution containing about 2 per cent by weight of potassium alum is substituted for 36 ml. of 0.25 N sulfuric acid containing about 2 per cent by weight of potassium alum. The final product obtained is similar in appearance to that described in Example IX, and when suspended in isotonic saline solution is useful for administration by injection.

*Example XIV*

About 10 grams of dried poison ivy leaves are ground and extracted with approximately 100 ml. of quinoline for 24 hours at room temperature. The extracted leaf meal is then removed and the liquid thus obtained is a solution of the reaction product of the quinoline with the allergenic component present in the leaves. It is sterile and is used as a stock solution from which the final product is made. About 40 ml. of the stock solution and about 100 ml. of acetone are mixed so that a single phase is obtained after the addition of 100 ml. of water and then about 48 ml. of a solution containing about 2 per cent by weight of potassium alum is slowly added with continuous agitation. The reaction product is obtained as a finely divided, deep green precipitate, which after standing at about 5° C. is removed from the supernatant liquid and washed with isotonic saline solution containing a small amount of phenol. This product is then suspended in isotonic saline solution for use in administration by injection.

*Example XV*

About 10 grams of freshly harvested poison oak leaves are ground and are extracted with approximately 100 ml. of quinoline at room temperature for 24 hours. The mixture is filtered. The filtrate is mixed first with an equal volume of acetone and then with a similar volume of water and the mixture is treated with about 48 ml. of a solution containing about 2 per cent by weight of potassium alum, as in Example XIV. This mixture is further processed as in Example XIV and yields a product identical as that there described, and when suspended in isotonic saline solution is useful for administration by injection.

*Example XVI*

The procedure described in Example XIV is repeated with the exception that dried poison sumac leaves are substituted for the dried poison ivy leaves that are employed. The final product obtained is similar in appearance to that described in Example XIV, and when suspended in isotonic saline solution is useful for administration by injection.

It will be understood by those skilled in the art to which this invention pertains, that modifications and changes may be made in the procedure above described within such skill without departure from the spirit of this invention and without evasion of the following claims.

Having thus described the instant invention, what it is desired to secure by Letters Patent is set forth in the following claims.

I claim:

1. The process for preparing antigenic substances characterized by stability of physiological activity upon storage, that comprises directly treating parts of plants of the genus Rhus containing a non-proteinaceous physiologically active principle, with pyridine to form a reaction product of pyridine with said principle, treating the reaction product thus obtained with a substance selected from the class consisting of aqueous mineral acid solution and acidic aqueous alum solution to cause separation of a substantially insoluble allergenic product, and recovering said allergenic product.

2. The process for preparing antigenic substances characterized by stability of physiological activity upon storage, that comprises directly treating parts of plants of the genus Rhus containing a non-proteinaceous physiologically active principle, with pyridine to form a reaction product of pyridine with said principle, treating the reaction product thus obtained with alum solution to cause separation of a substantially insoluble allergenic product, and removing said allergenic product.

3. The process for preparing antigenic substances characterized by stability of physiological activity upon storage, that comprises directly treating parts of plants of the genus Rhus containing a non-proteinaceous physiologically active principle, with pyridine to form a reaction product of pyridine with said principal, treating the reaction product thus obtained with alum solution under acid conditions to cause separation of a substantially insoluble allergenic product, and removing said allergenic product.

4. The process for preparing antigenic substances characterized by stability of physiological activity upon storage, that comprises directly treating poison ivy plant parts containing a non-proteinaceous physiologically active principle, with pyridine to form a reaction product of pyridine with said principle, treating the reaction product thus obtained with alum solution to cause separation of a substantially insoluble allergenic product, and removing said allergenic product.

5. The process for preparing antigenic substances characterized by stability of physiological activity upon storage, that comprises directly treating poison ivy plant parts containing a non-proteinaceous physiologically active principle, with pyridine to form a reaction product of pyridine with said principle, treating the reaction product thus obtained with alum solution under acid conditions to cause separation of a substantially insoluble allergenic product, and removing said allergenic product.

6. The process for preparing antigenic substances characterized by stability of physiological activity upon storage, that comprises directly treating poison oak plant parts containing a non-proteinaceous physiologically active principle, with pyridine to form a reaction product of pyridine with said principle, treating the reaction product thus obtained with alum solution to cause separation of a substantially insoluble allergenic product, and removing said allergenic product.

7. The process for preparing antigenic substances characterized by stability of physiological activity upon storage, that comprises directly treating poison oak plant parts containing a non-proteinaceous physiologically active principle, with pyridine to form a reaction product of pyridine with said principle, treating the reaction product thus obtained with alum solution under acid conditions to cause separation of a substantially insoluble allergenic product, and removing said allergenic product.

8. The process for preparing antigenic substances characterized by stability of physiological activity upon storage, that comprises directly treating poison sumac plant parts containing a non-proteinaceous physiologically active principle, with pyridine to form a reaction product of pyridine with said principle, treating the reaction product thus obtained with alum solution to cause separation of a substantially insoluble allergenic product, and removing said allergenic product.

9. The process for preparing antigenic substances characterized by stability of physiological activity upon storage, that comprises directly treating poison sumac plant parts containing a non-proteinaceous physiologically active principle, with pyridine to form a reaction product of pyridine with said principle, treating the reaction product thus obtained with alum solution under acid conditions to cause separation of a substantially insoluble allergenic product, and removing said allergenic product.

10. An allergenic product obtained by the process of claim 1, characterized by retention of physiological potency when stored in aqueous solutions at ordinary room temperature.

11. An allergenic product obtained by the process of claim 6, characterized by retention of physiological potency when stored in aqueous solutions at ordinary room temperature.

12. An allergenic product obtained by the process of claim 8, characterized by retention of physiological potency when stored in aqueous solutions at ordinary room temperature.

13. An allergenic product obtained by the process of claim 4, characterized by retention of physiological potency when stored in aqueous solutions at ordinary room temperatures.

MARGARET B. STRAUSS.

REFERENCES CITED

The following references are of record in the file of this patent:

UNITED STATES PATENTS

| Number | Name | Date |
|---|---|---|
| 1,559,340 | Masucci | Oct. 27, 1925 |
| 2,316,311 | Boatner | Apr. 13, 1943 |

FOREIGN PATENTS

| Number | Country | Date |
|---|---|---|
| 453,159 | Great Britain | Sept. 7, 1936 |

OTHER REFERENCES

U. S. Naval Medical Bulletin, vol. 36, pp. 18–29 (1938).

Jour. Amer. Pharm. Assoc., Jan. 1941, pp. 17 and 18.

Jour. Amer. Med. Assoc., Dec. 5, 1942, page 1164.

Mellor: "Comprehensive Treatise on Inorganic and Theoretical Chemistry, vol. 5 (Longmans, Green & Co.; New York, N. Y.; 1924), pages 352 and 353.